Figure 1:
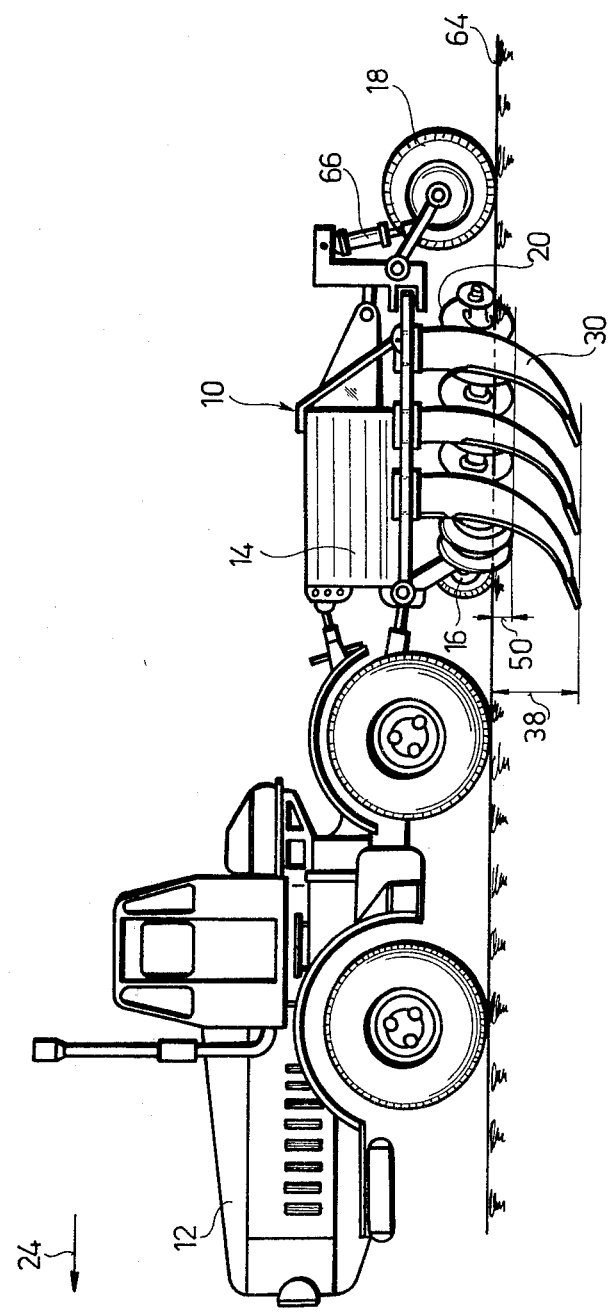

United States Patent [19]

Sipos et al.

[11] 4,243,104
[45] Jan. 6, 1981

[54] SOIL WORKING MACHINE

[75] Inventors: Sandor Sipos, Gödöllö; Sandor Varga, Kecskemet; Imre Hali, Zalaegerszeg, all of Hungary

[73] Assignee: Kaposvári Mezögazdasági Gépgyártó és Szolgáltató Vállalat in Kaposvár, Kaposvár, Hungary

[21] Appl. No.: 919,454

[22] Filed: Jun. 27, 1978

[51] Int. Cl.³ .................... A01B 13/08; A01B 35/18
[52] U.S. Cl. .................. 172/148; 172/149; 172/178; 172/196; 172/652
[58] Field of Search ............... 172/196, 197, 178, 145, 172/148, 149, 651, 652, 653, 484, 584, 587, 588, 591, 582, 583, 142, 151, 174, 175, 179, 699, 690, 648, 650

[56] References Cited

U.S. PATENT DOCUMENTS

| 1,557,109 | 10/1925 | Vandeberg | 172/603 |
| 2,766,672 | 6/1962 | Zunk | 172/156 |
| 3,630,291 | 12/1971 | Womble | 172/582 |
| 3,756,327 | 9/1973 | Orthman | 172/697 |
| 3,757,871 | 9/1973 | Maust | 172/413 |
| 4,095,653 | 6/1978 | Lely | 172/177 |

FOREIGN PATENT DOCUMENTS 1046108 12/1953 France .................................. 172/652

OTHER PUBLICATIONS

AMCO Rippin Buster Advertising Brochure, AMCO, Yazoo City, Miss.

Primary Examiner—Richard J. Johnson
Attorney, Agent, or Firm—Karl F. Ross

[57] ABSTRACT

A soil cultivating machine has a pair of frame units inclined rearwardly divergently to each other, each frame unit having a respective tool-holding shaft. Each shaft is associated with two tool-holding bars, one in front of the shaft and one behind it. The bars carry deep-tilling implements, while the shafts carry disc-like tools. There is a prescribed numerical relationship between the depth of tilling by these implements and the distance, measured in a direction parallel with the direction of advance of the machine, between a given implement and the associated disc-like tool. There is a further prescribed numeral relationship between this distance and the velocity of advance of the machine.

3 Claims, 6 Drawing Figures

SOIL WORKING MACHINE

DESCRIPTION

The invention relates to a soil working (tilling) machine for use in place of ploughing and/or for performing a plurality of agrotechnological working processes in a single operational step e.g. for deep-harrowing, for summertime works for the prevention of aridity of the soil, for the preparation of the soil for taking up autumnal precipitation, the machine consisting of a skeleton frame that can be coupled to a prime mover and on which soil working means are arranged. One part of the soil working means consists of disc-like tilling elements the tool-holding shafts of which are inclined at an angle to the direction of advance of the tilling machine, with the end of the shafts being connected to the skeleton frame.

As is known, the various agrotechnical operations of deep harrowing, tilling for the prevention of the aridity of soil, the preparation of the soil for taking up precipitation, deep-fertilising to provide a fresh supply of soil nutrients, the dispensing and spreading of soil improving materials, etc. are generally carried out in separate processes according to the agrotechnological objectives.

For these operations suitable machines and devices e.g. ploughs, disc-harrows, sub-soil loosening devices deep-fertilizing machines etc. are used.

Generally, tilling machines are divided into three main categories. These are: ploughs, disc-like tilling elements and subsoil looseners. In addition, soil milling tools, stalk choppers and other suitable devices are used to perform other additional operations, e.g. so-called adaptors for carrying out deep-fertilizing to increase fertility of the soil. These known types of machines are generally suitable for performing only one specific, defined operation.

The main shortcoming of ploughs is that they cannot produce an agrotechnologically desirable loose, crumbly soil. Particularly in the case of wet soil the ploughing gives a "doughy" result. Where the soil is too dry, the depth of penetration of the ploughshares is insufficient. In such a case very large traction forces are necessary to force the plough into the soil in order to obtain the required depth of penetration. This way, however, only rough tilling can be achieved. In neither of these cases is the water-retaining capacity of the soil satisfactory.

The above-mentioned shortcoming is accompanied in the case of sandy or alkaline soil by "wild" sand and strongly alkaline soil coming to the surface, respectively. For this reason, at present only shallow tilling can be carried out on this kind of soil. Moreover, in case of such soils the rate of tilling is seldom satisfactory. For the purpose of small tilling depths disc-like tilling means are used. Generally, the machines or tilling tools are loaded with supplementary weights of large mass to obtain the desired effect. It is also a characteristic of soils of poor quality that the clods at the surface are very crumbly while the layers of soil beneath the surface remain so compact and dense that they cannot be loosened by conventional tilling operations.

The experience with sub-soil loosening machines is not unequivocally favorable either. Although they can loosen the sub-soil the remnants of plants (stubble) lying close to the surface of the soil cannot be chopped up and turned under the soil with such machines. Thus on stubble fields of maize and cereal crops, the remnants of stalks and roots cannot decompose completely. Furthermore, no satisfactory soil conditioning can be achieved by sub-soil looseners after the summer harvest. This is because large clods are left close to the surface between which deep open cracks occur. Such soil conditions are very harmful, particularly in the case of lengthy spells of dry weather or drought.

According to the results of the latest agricultural research in areas suffering from lack of precipitation the need is for complex soil cultivation which comprises not only deep-harrowing but also the structuring of soil layers close to the surface to a crumbly consistency of small clod size. However, none of the known tilling machines is suitable for simultaneously performing these operations. Although the required soil condition can be achieved with these machines, nevertheless various different machines or machine groups require to be used in a plurality of sequential operations. The development of high performance power machines has opened the way to the linking together of various soil cultivating operations. This trend is known as "minimum tillage", according to which one-step tillage is not only the most beneficial for the soil structure, but is also the most economical from point of view of time and energy. Various tilling machines with discs have been developed for this purpose.

Such a disc-type tilling machine is known. This machine is equipped with a series of discs mounted on four separate bars. The four bars are grouped in two pairs. One pair is at the front—in relation to the direction of advance—and is rearwardly convergent, while the other pair is at the rear and is rearwardly divergent. During advance of the machine the bars are fixed and the discs can rotate relatively to the bars. In this construction the discs are in a laterally fixed position in relation to the disc-holding beam and their height cannot be changed. Because of the presence of four series of discs, the skeleton frame or chassis is of complicated structural design. A disadvantage of this construction is that with it the desired soil condition cannot be achieved, especially with neglected alkaline soils of thin layers of humus (topsoil). A further shortcoming is that the water absorptivity and retentivity of the soil cannot be improved. In addition, this machine cannot be fitted with additional tilling tools.

A machine with a universal skeleton frame is described in U.S. Pat. No. 3,756,327. In this machine, in addition to disc-like tilling means cultivator hoe-like tilling tools are also provided. However, the operation of these tilling tools is uncoordinated with the disc-like tools both from a structural and an agrotechnological point of view. In this construction, the skeleton frame has a rectangular shape in plan, the longer axis of symmetry of which is perpendicular to the direction of advance of the machine. Its defect is that the machine may become clogged up even in the case of an only slightly "unclean" (weedy) soil. The risk of clogging is increased if remnants of stalks are present on the surface of the soil. Also, it is a conceptual shortcoming of this construction that the disc-like tools must be mounted individually and journalled on the skeleton frame. Thus, this machine can be considered as a tilling machine of low output only. Besides, there is no possibility for an exact setting and maintenance of the depth of tilling.

The invention aims at the elimination or reduction of the described disadvantages.

Accordingly, an aim of the invention is to provide a tilling machine with which near-optimum agrotechnological soil condition can be provided in a single working step.

The invention is based on the discovery that this problem can be solved if, breaking away from the practice followed hitherto, the deep-tilling tools and the disc-like tilling means are associated in a specific way and the tilling is carried out in one single working step. Namely, in this way, a kind of tilling can be carried out which is least detrimental to the soil structure and consequently a mellowed, crumbly well mixed and turned-over surface layer and a loosened subsoil layer are obtained. The ploughing can be replaced by this single-step operation and the soil can be made suitable for an almost optimum capacity for water intake and retention.

According to the invention the problem set out above is solved with a tilling machine of the above-described type which consists of two frame units that diverge rearwardly relative to the direction of advance of the tilling machine, each of the frame-units having at least one tool-holding shaft as well as (relative to the direction of advance of the tilling machine) one fore and one rear tool-holding beam arranged respectively in front and behind the tool-holding shaft; the front tool-holding beam and/or the rear tool-holding bar or beam is/are provided with deep tilling tools, formed by downwardly extending shanks having pointed tips, that are laterally slidable and fixable, each deep-tilling tool being associated with one disc-like tilling element, and each tool-holding shaft is coupled to the corresponding frame-units so that their relative height is variable; the separation distance in the direction of advance between the centre line of each disc-like tilling element and the centre line of the point of fastening of the associated deep-tilling tool is at most six times the size of the tilling depth of deep-tilling while the index number measuring the separation distance in meters is at most ten times of the value of the index number measuring the speed of advance of the tilling machine expressed in meters per second.

Expediently, the tilling depth of the deep-tilling tools should be at most fifteen times the magnitude of the working depth of the disc-like tilling elements.

According to another preferred feature of the invention, it is advantageous if the front of the skeleton frame (relative to the direction of advance) is provided with at least one hinge to change the angle of splay between the frame units. In this embodiment, a spacer rod that is removable and/or variable in length is inserted between the rear ends of the frame units of the skeleton frame.

Expediently, the disc-like tilling elements are fixed on the tool-holding shaft against rotation, but their position can be rearranged along these shafts.

According to the invention in another possible embodiment, the deep-tilling tools can be repositioned on the tool-holding beams.

In a preferred embodiment, the skeleton frame can be provided with additional tilling tools e.g soil caulking rollers, harrows, clod breakers, soil shredders, cultivators, soil milling tool, stalk choppers as well as suitable units for storing plant protecting chemicals or soil nutrient replenishing agents and units for dispensing of these materials (expediently in a controllable manner) or with any desired combination of such units.

Figure 2:
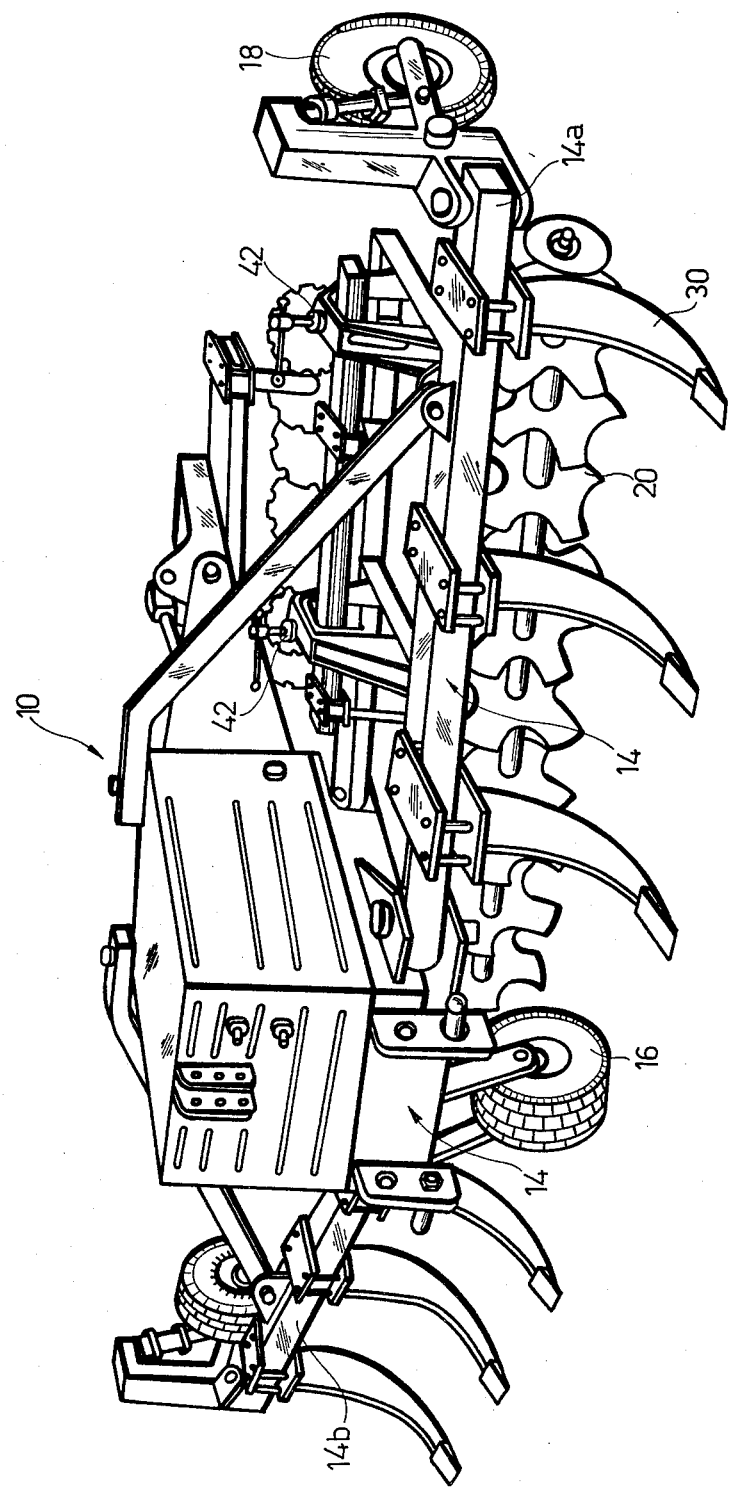
Figure 3:
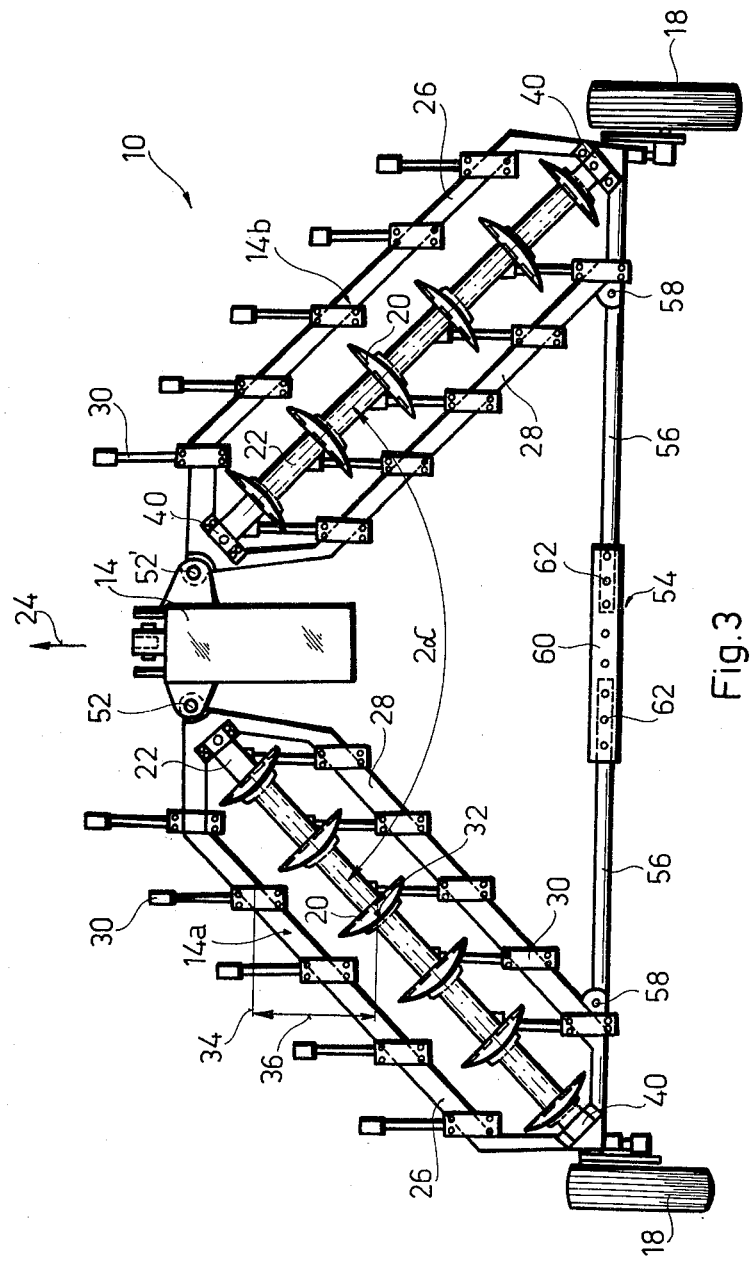
Figure 5:
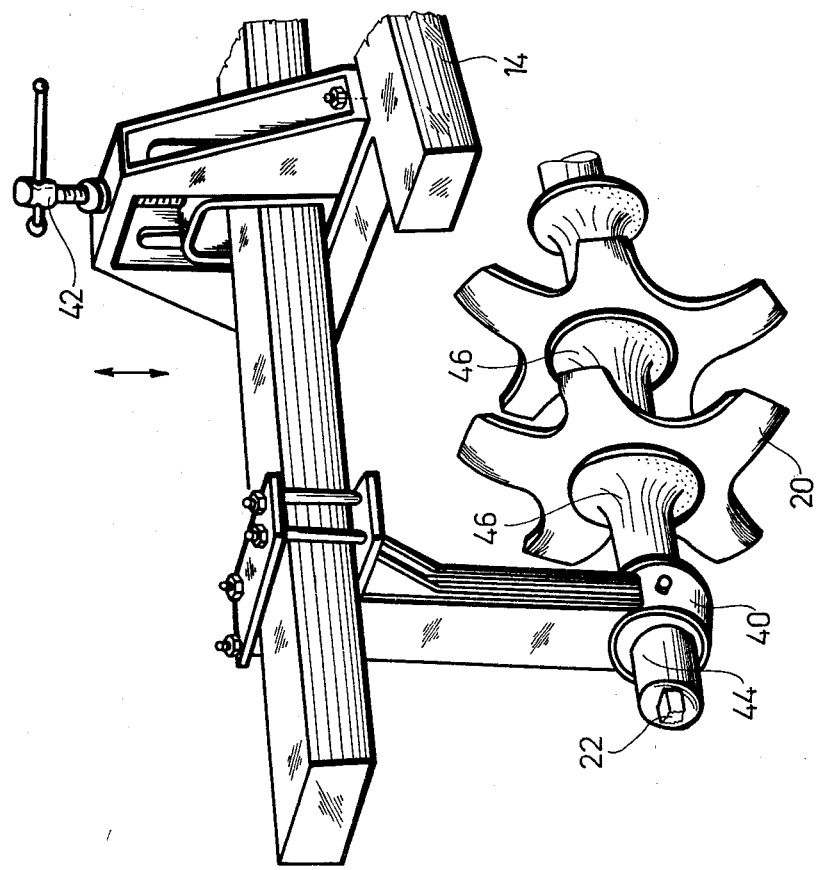
Figure 4:
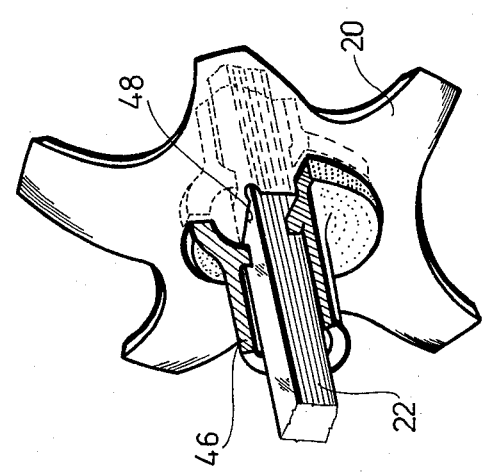
Figure 6:
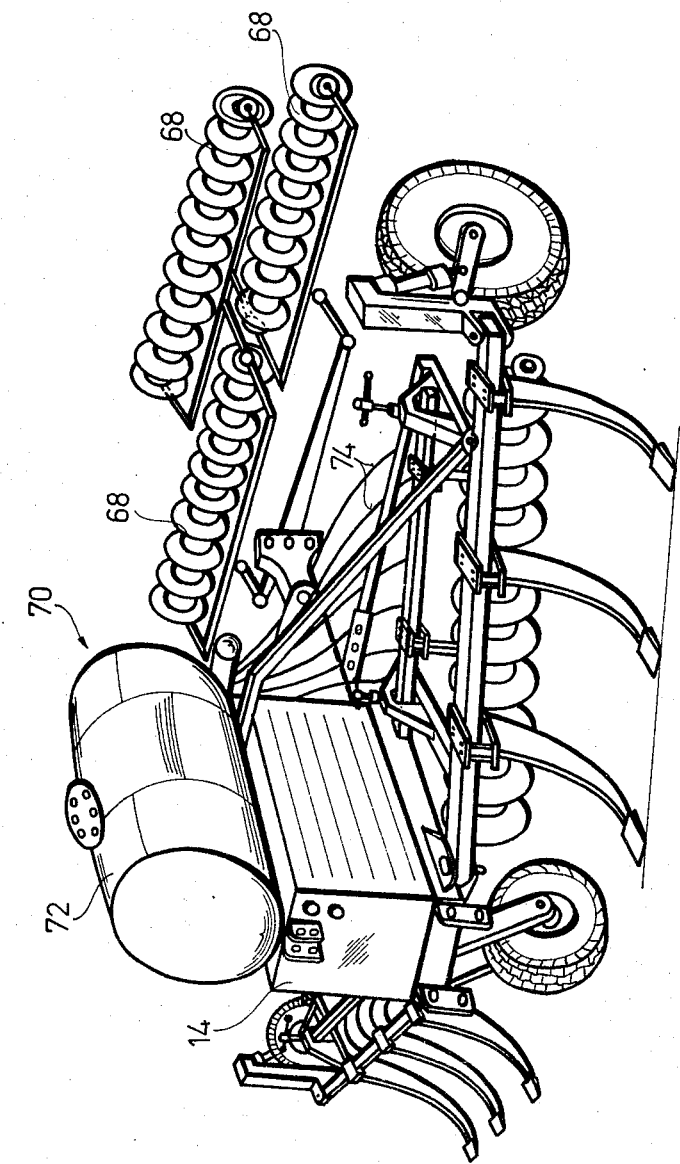

The invention is described purely by way of example of a preferred embodiment illustrated in the accompanying drawings, where FIG. 1 is a side view of a preferred tilling machine according to the invention, coupled to a prime mover, FIG. 2 is a perspective view of the tilling machine according to FIG. 1, on an enlarged scale, FIG. 3 is a diagrammatic plan view of the tilling machine according to FIG. 2, in top view, FIG. 4 shows a detail, partly in section, of the tilling machine shown in FIG. 2 on an enlarged scale, FIG. 5 is a perspective view of a further detail, and FIG. 6 is a perspective view of the tilling machine shown in FIG. 2, fitted with additional soil-working means.

As shown in FIG. 1, the tilling machine 10 has a skeleton frame 14 which can be coupled in a per se known manner to a prime mover, in the present case to a high-powered tractor 12. In the illustrated example the skeleton frame 14 has a semi-suspended construction and is provided with front and rear ground-engaging wheels 16, 18.

Known tilling means are arranged on the skeleton frame 14, some of which consist of disc-like tilling elements. In the present case these tilling elements are lobed discs 20 arranged on tool-holding shafts 22. However, it is possible for the discs 20 to be corrugated or flat. As is known the tool-holding shafts 22 form an angle with the direction of advance of the tilling machine 10 which is indicated by an arrow 24; their ends are connected to the skeleton frame 14.

According to the invention, the skeleton frame 14 consists of two rearwardly divergent (relative to the direction of advance) units 14a and 14b forming an angle, here 2α and each of them is provided with a respective tool-holding shaft 22. (FIG. 3). The skeleton frame 14 has, relative to the direction of advance 24 of the tilling machine, a front and a rear tool-holding plough-beam 26 and 28, respectively arranged in front and behind the tool-holding shafts 22. According to the invention, the per se known deep-tilling tools 30 are arranged on the fore and/or rear tool holding bars or beams 26 or 28—in the illustrated case on both—so that they can be displaced laterally on and clamped to the respective bar.

According to the invention, each deep-tilling tool is associated with at least one disc-like cultivating element, here with a disc 20. Furthermore, each tool holding shaft 22 is connected to one of the frame-units 14a or 14b so that, relative to the direction of advance, the "following" distance 36 between the center line 34 of the point of fastening of the associated deep-tilling tool 30 and the center line 32 of each disc 20 should be at most six times the magnitude of the depth of tilling indicated by the reference number 38. (FIGS. 1 and 3). In addition, according to the invention, the value of the "following" distance 36 expressed in meters should not exceed ten times the value of the rate of advance of the tilling machine 10, measured in meters per second.

The end of the tool holding shafts 22 are pivotally journalled in bearing blocks 40 so that their height can be adjusted relative to the frame-units 14a, 14b as known per se e.g. by means of a screw-spindle 42 (FIG. 5). The tool holding shafts 22 are provided with dowel pins on their ends and their sections between the dowels have an advantageously rectangular cross-section. The discs 20 arranged on the shaft sections with rectangular cross-section are spaced by inserting spacer elements 46 of predetermined length, thus creating a connection to the shafts 22 that is fixed against rotation. This connection is clearly shown in FIG. 4 where the rectangular aperture of the disc 20 for receiving the shaft 22 is indicated by the reference number 48. By insertion of other spacer elements 46 of different lengths, the discs are displaceable along the shaft 22. The depth of tilling of the deep-tilling tools 30 indicated by the reference number 38 must be selected in such a way that it should be not more than at most fifteen times the depth of tilling effected by discs 20, indicated by the reference number 50 (FIG. 1).

According to the preferred embodiment of the invention the frame units 14a and 14b of the skeleton frame 13 are provided on their front part, in relation to the direction of advance, with at least one hinge, thus rendering the splay angle 2α between the frame units 14a and 14b variable. In the illustrated embodiment, the frame units 14a, 14b are respectively connected to the skeleton frame 14 via respective hinges 52, 52'. Moreover, as shown in FIG. 3, for the purpose of setting the splay angle 2α, a spacer rod 54 which is advantageously interchangeable and/or of variable length is inserted between the rear (relative to the direction of advance) end of the frame-units 14a and 14b. In this case the spacer rod 54 consists of two rods 56, which are fastened at their respective ends via dowel pins 58 to the units 14a, 14b. Their other ends are guided displaceably in a sleeve 60 such that their position inside the sleeve 60 can be fixed in the new position by pegs 62.

The position of the front 16 and of the two rear wheels 18 is adjustable relative to the skeleton frame 14 and thus the height of the skeleton frame 14 over the soil surface 64 is adjustable in per se known manner. In the illustrated example the front wheel 16 is coupled to a non-illustrated hydraulic cylinder and each of the rear wheels 18 is linked to a respective hydraulic cylinder 66. The rear wheels 18, have in the present case, self-aligning suspensions, as is known.

According to the invention, the skeleton frame 14 can be associated or provided with additional tilling or soil cultivating implements, e.g. soil compacting cylinders (rollers), harrows, soil shredders, clod breakers, cultivators, soil milling tools, stalk choppers, as well as with suitable units for storing and dispensing plant protecting chemicals and soil nutrients or any arbitrary combination of these units. In the embodiment illustrated in FIG. 6, annular cylinders 68 are attached behind the skeleton frame 14 which carries a tank 72 of a spraying apparatus 70 including adjustable spray units 74.

The main advantage of the illustrated preferred embodiment of the tilling machine 10 according to the invention is that it makes tilling substantially faster and more effective than hitherto. By its use, the rate of ploughing may be doubled at least and the power of traction of the power machine can be utilized to optimum efficiency. Since all agrotechnologically desirable operations can be carried out in one single operational step of the tilling machine 10, there is no need for the tractor to cross already cultivated areas and therefore all disadvantageous effects deriving from this and the disruption of the soil structure may be eliminated.

With the application of the proposed machine to ploughing, a greater specific area-output results and when applied to sub-soil loosening, greater tilling speeds can be achieved. This means, therefore, that the same size of area can be tilled with less time and with lower costs.

From an agrotechnological point of view it is advantageous that each of the disc-like tilling elements 20 is associated with a respective deep-tilling tool 30 and so a novel, complex and higher quality tilling can be achieved. Since the tool-holding shafts 22 and discs 20 as well as the deep-tilling tools 30 can be set and adjusted, it is possible to adapt the tilling to the structure and moisture of a given soil and to other requirements that are important from a plant-biological point of view.

With aid of the proposed construction we have been able to achieve a substantially better quality of tilling, especially in the case of soils in unhealthy condition e.g. alkaline, neglected soils or soils with only thin layers of topsoil (humus). Also it has been proved that in regions with meagre precipitation the water absorbing and water retaining capability of soil has been effectively improved.

Our experiments with the preferred embodiment according to the invention have proved that the quality of tilling carried out with the deep-tilling tools 30 associated with the discs 20 in a novel and specific fashion is substantially better than that achievable either by deep-tilling or by disc-tilling, irrespective of whether these operations were carried out separately or in either sequence one after the other. It is a substantial advantage that better soil conditions can be achieved with relatively lower costs. In addition, the tilling machine 10 can be associated simply with additional tilling means to carry out supplementary operations.

It is a further advantage of the proposed construction that only one person, i.e. the tractor driver, is required for handling the tilling machine 10, who can easily put the machine into either a transportable or into a working condition. By virtue of the concept that the deep-tilling tools 30 can be placed in front of the discs 20, it is ensured that no blockage of the tilling can occur. Furthermore the depth of tilling can be set exactly and maintained during working. Due to the symmetrical arrangement of the tilling machine 10, no laterally acting forces occur during traction.

On the basis of the above, it can be seen that with use of the preferred embodiment of the invention, loose soil of high quality with only minute clods is obtained at relatively low cost.

We claim:

1. A soil cultivating machine comprising:
   a pair of frame units extending rearwardly divergently to each other, each of said frame units having a respective front tool-holding bar and rear tool-holding bar;
   a respective shaft rotatably mounted on each of said frames between said respective front bar and rear bar;
   a plurality of tilling discs mounted on said respective shafts and rotatably fixed thereto for the joint rotation therewith, said discs being adjustable to change the positions thereof along said shaft;
   a plurality of first plowshares adjustably mounted on said respective front bars, each of said first plowshares being positioned directly in front of a tilling disc relative to the direction of advance of said machine;
   a plurality of second plowshares adjustably mounted on said respective rear bars and extending forwardly beneath said discs, said second plowshares being laterally offset from said first plowshares, said first and second plowshares being formed by shanks having pointed tips;

means on said machine for adjusting the divergence of said frame units;

a plurality of ground engaging wheels mounted on said machine and vertically displaceable for adjusting the penetration depth below ground level of said first and second plowshares; and means on each of said frame units for vertically displacing said respective shaft thereof for adjusting the penetration depth of said discs below ground level.

2. The machine defined in claim 1 wherein each of said plowshares is mounted directly upstream of the center of a tilling disc at a distance of not more than six times the penetration depth of said first and second plowshares.

3. A soil cultivating machine comprising:

a pair of frame units extending rearwardly and divergently to each other;

a respective shaft mounted on each of said frame units;

a plurality of tilling discs mounted on said respective shafts;

a respective front tool-holding bar and rear tool-holding bar on said frame units flanking said respective shaft;

a plurality of deep-tilling implements adjustably mounted on each of said respective tool-holding bars; and means on each of said frame units for adjusting the mutual height between each of said tilling discs and at least one of said deep-tilling implements associated with each of said tilling discs.

* * * * *